(12) United States Patent
Glerum et al.

(10) Patent No.: US 12,514,618 B2
(45) Date of Patent: Jan. 6, 2026

(54) EXPANDABLE BONE CORE FOR PEDICLE SCREW FIXATION

(71) Applicant: GLOBUS MEDICAL, INC., Audubon, PA (US)

(72) Inventors: Chad Glerum, Pennsburg, PA (US); Tyler Hessler, Phoenixville, PA (US)

(73) Assignee: Globus Medical Inc., Audubon, PA (US)

( * ) Notice: Subject to any disclaimer, the term of this patent is extended or adjusted under 35 U.S.C. 154(b) by 479 days.

(21) Appl. No.: 17/711,490

(22) Filed: Apr. 1, 2022

(65) Prior Publication Data
US 2023/0310037 A1  Oct. 5, 2023

(51) Int. Cl.
| | |
|---|---|
| *A61B 17/70* | (2006.01) |
| *A61B 17/84* | (2006.01) |
| *A61B 17/86* | (2006.01) |
| *A61B 17/88* | (2006.01) |
| *A61F 2/44* | (2006.01) |

(52) U.S. Cl.
CPC ........ *A61B 17/7032* (2013.01); *A61B 17/844* (2013.01); *A61B 17/863* (2013.01); *A61B 17/8847* (2013.01); *A61B 17/8852* (2013.01); *A61F 2/44* (2013.01)

(58) Field of Classification Search
CPC .. A61B 17/844; A61B 17/8685; F16B 13/124
See application file for complete search history.

(56) References Cited

U.S. PATENT DOCUMENTS

| | | | | |
|---|---|---|---|---|
| 349,851 | A * | 9/1886 | Lorme | F16B 13/124 411/63 |
| 1,051,444 | A * | 1/1913 | Pleister | F16B 13/124 411/80.5 |
| 1,057,975 | A * | 4/1913 | Newhall | F16B 13/124 411/80.5 |
| 1,499,072 | A * | 6/1924 | Pleister | F16B 13/124 411/80.5 |
| 4,474,516 | A | 10/1984 | Schiefer | |
| 6,679,662 | B2 * | 1/2004 | Nehl | F16B 13/128 411/32 |
| 8,388,660 | B1 * | 3/2013 | Abdou | A61B 17/8685 606/267 |
| 10,405,890 | B2 * | 9/2019 | Ratron | A61B 17/844 |
| 11,083,509 | B2 * | 8/2021 | Kim | A61B 17/686 |
| 2003/0017024 | A1 * | 1/2003 | Bisping | F16B 13/0825 411/60.1 |
| 2005/0228391 | A1 | 10/2005 | Levy et al. | |
| 2011/0071579 | A1 * | 3/2011 | Reach, Jr. | A61B 17/0401 411/360 |
| 2011/0144766 | A1 | 6/2011 | Kale et al. | |
| 2017/0100177 | A1 | 4/2017 | Kim | |
| 2018/0070986 | A1 | 3/2018 | Agarwal et al. | |

FOREIGN PATENT DOCUMENTS

| | | |
|---|---|---|
| EP | 3323363 A1 | 5/2018 |
| JP | 2008-502374 A | 1/2008 |

* cited by examiner

*Primary Examiner* — Nicholas W Woodall

(57) ABSTRACT

Pedicle bone anchor implants, assemblies, and methods thereof. The implant may include an expandable anchor having a body with expandable sections separated by one or more expansion joints, a plurality of expandable teeth, or an expandable head. The expandable anchor has a collapsed configuration and an expanded configuration, thereby creating a press-fit in adjacent bone.

10 Claims, 9 Drawing Sheets

EXPANDABLE BONE CORE FOR PEDICLE SCREW FIXATION

FIELD OF THE INVENTION

The present disclosure relates to surgical devices, and more particularly, to pedicle bone anchors and associated methods.

BACKGROUND OF THE INVENTION

Common procedures for handling pain associated with intervertebral discs that have become degenerated due to various factors such as trauma or aging may include the use of pedicle screw fixation and/or intervertebral fusion for fusing one or more adjacent vertebral bodies. Generally, bilateral pedicle screw fixation, for example, with a rod construct, may be used to treat degenerative disc disease and a multitude of other spine pathologies as a standard of treatment to stabilize two or more adjacent vertebral bodies.

Pedicle screw morphology has evolved over time to further improve the primary stabilization of the screws. However, paired with cyclic loading from normal patient lifestyles, screw loosening is still a primary concern. This issue is exacerbated by patients with poor bone quality which is commonly associated with screw pullout at the ends of rod constructs. There currently exist a need to improve the initial and long term stability of the pedicle screws especially in patients with osteoporotic bone.

SUMMARY OF THE INVENTION

To meet this and other needs, pedicle implants, assemblies, and methods are provided. In particular, a specialized pedicle screw may be used in conjunction with an expandable press-fit bone anchor. The implant may include an expandable plug with teeth or anchors that eject into bone. The implant may include a pedicle screw with an expandable proximal portion configured to increase the purchase in the pedicle space. The expandable anchors are configured to increase and improve the integrity of the bone-implant interface. The implants may improve the primary stability, reduce the effects of micro motion, and/or facilitate osseointegration of the implant with the surrounding bone.

According to one embodiment, an expandable implant includes an expandable anchor and a pedicle screw. The expandable anchor has a body with a plurality of expandable sections separated by one or more expansion joints. The anchor includes a central through hole arranged along a central longitudinal axis of the anchor. The pedicle screw has a head and a shaft. The pedicle screw is receivable in the expandable anchor. The expandable anchor has a collapsed configuration and an expanded configuration, thereby creating a press-fit in adjacent bone.

The expandable implant may include one or more of the following features. The plurality of expandable sections may be configured to radially expand outward and away from one another, thereby increasing an outer diameter of the anchor. When the expandable sections are expanded apart, a width of each expansion joint may increase to enlarge the anchor. The expandable anchor may have a generally cylindrical shape. The expandable anchor may include four expandable sections each adjacent to one expansion joint. The expansion joints may include a malleable or flexible material. The central through hole may be internally threaded and configured to engage with corresponding threads along the shaft of the pedicle screw. The anchor may include a plurality of teeth arranged in an array about the periphery of the expandable sections. The teeth may be pyramidal in shape or otherwise configured to engage bone. The length of the expandable anchor may be shorter than the length of the pedicle screw and may be arranged along the distal end of the pedicle screw and secured in the vertebral body of the vertebra.

According to another embodiment, an expandable implant with deployable teeth. The expandable implant includes an enlarged head and a shank extending along a central longitudinal axis. The shank defines a center channel in fluid communication with a plurality of openings. The implant further includes a plurality of moveable teeth. Each tooth has an elongated body with an inner end receivable in the central channel and an outer end configured to eject from the openings in the shank. The teeth have a retracted position and deployed position whereby the teeth extend radially outward from the shank.

The expandable implant may include one or more of the following features. The teeth may be positioned generally perpendicular to the central longitudinal axis of the shank. The inner end of each tooth may include an angled portion configured to help expand the teeth. The teeth may be arranged in a pattern around the periphery of the shank. The teeth may be ejected pneumatically, with a pressurized liquid, or with bone cement, for example.

According to another embodiment, a method for stabilizing a vertebra includes one or more of the following steps in any suitable order: (1) posteriorly accessing a spine of a patient; (2) preparing a channel (e.g., a pair of bilateral channels) through a pedicle and a vertebral body of a vertebra; (3) inserting an expandable anchor through the channel and into the vertebral body of the vertebra, the anchor having a body with a plurality of expandable sections separated by one or more expansion joints, a central through hole, and a plurality of teeth arranged about the expandable sections; (4) expanding the expandable anchor to create a strong press-fit in the vertebra; and (5) inserting a pedicle screw through the channel into the central through hole of the expandable anchor and securing the pedicle screw to the expandable anchor. The expandable anchor may be provided only at a distal region of the pedicle screw and within the vertebral body of the vertebra. The anchor may be expanded by an instrument before inserting the pedicle screw into the expanded anchor. Alternatively, insertion of the pedicle screw into the anchor simultaneously expands the anchor as the pedicle screw is threaded through the anchor.

Also provided are kits including pedicle implants of varying types and sizes, interbody fusion devices of varying types and sizes, rods, fasteners or anchors, k-wires, insertion tools, instruments, and other components for performing the procedure.

BRIEF DESCRIPTION OF THE DRAWINGS

A more complete understanding of the present invention, and the attendant advantages and features thereof, will be more readily understood by reference to the following detailed description when considered in conjunction with the accompanying drawings, wherein.

DETAILED DESCRIPTION OF THE INVENTION

Bilateral pedicle screw fixation may be used to treat degenerative disc disease and other spine pathologies. One or more expandable implants may be used to secure the device(s) within the pedicle and/or vertebral body of the vertebra. The expandable implants may include an assembly including an expandable anchor for receiving a pedicle screw, an expandable bone plug with deployable prongs or teeth, an expandable fastener with an expandable head and proximal shaft for receiving an expansion member, or other similar expansion mechanisms. The expandable configuration(s) may allow for unused pedicle space to be filled and utilized. The expandable implants may improve the primary stability of the construct, which may help to reduce the effects of micro motion and facilitate osseointegration of the implant with the surrounding bone. The terms device, fixation device, assembly, and implant may be used interchangeably herein.

Figure 1:
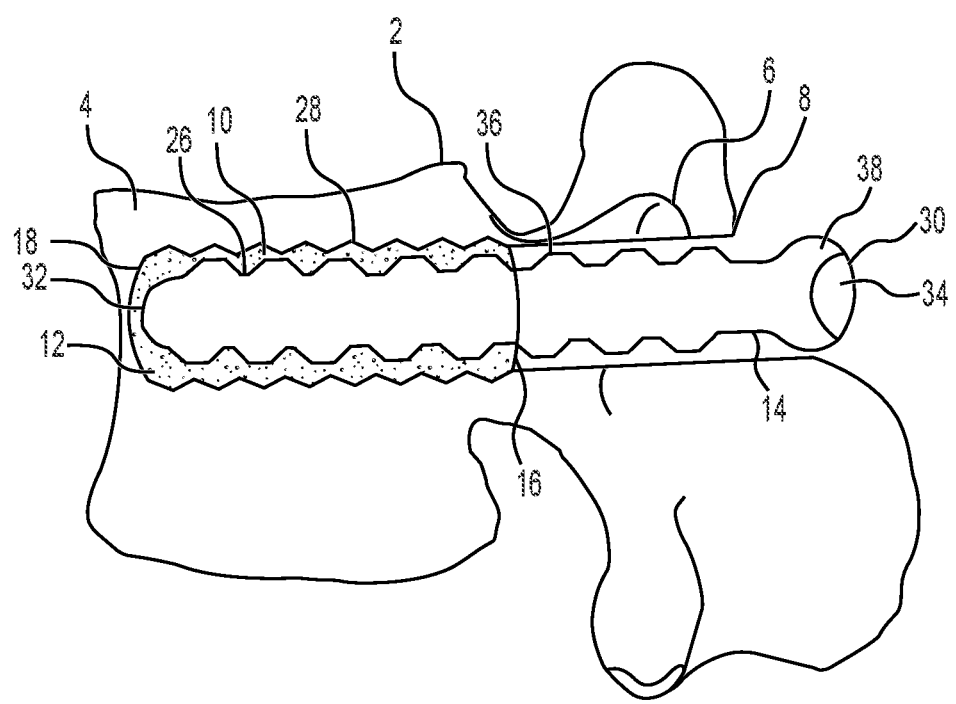
FIG. 1 is a sagittal view of a vertebra with an orthopedic fixation assembly including a pedicle screw received within an expandable bone anchor according to one embodiment.

Referring now to FIG. 1, an orthopedic fixation assembly, pedicle bone fastener assembly, or implant 10 according to one embodiment is shown implanted into vertebra 2. The method of fixation may include, for example, accessing the spine from the posterior and inserting the implant 10 into the pedicle 6 of the vertebra 2. If necessary, bone may be removed from the pedicle 6 and/or the vertebral body 4 in order to facilitate placement of the device 10. One or more pedicle devices 10 may be used alone or in conjunction with a traditional interbody fusion device. Although the method is shown with respect to a single pedicle 6, it will be appreciated that the other pedicle (not shown) may also receive the same or a similar device. In particular, a pair of implants 10 may be implanted bilaterally and angled medially toward one another in the vertebral body 4, but the final location and orientation of the devices 10 will be selected by a surgeon. It will also be appreciated that the same or similar devices may also be used on adjacent or other levels.

Figure 2:
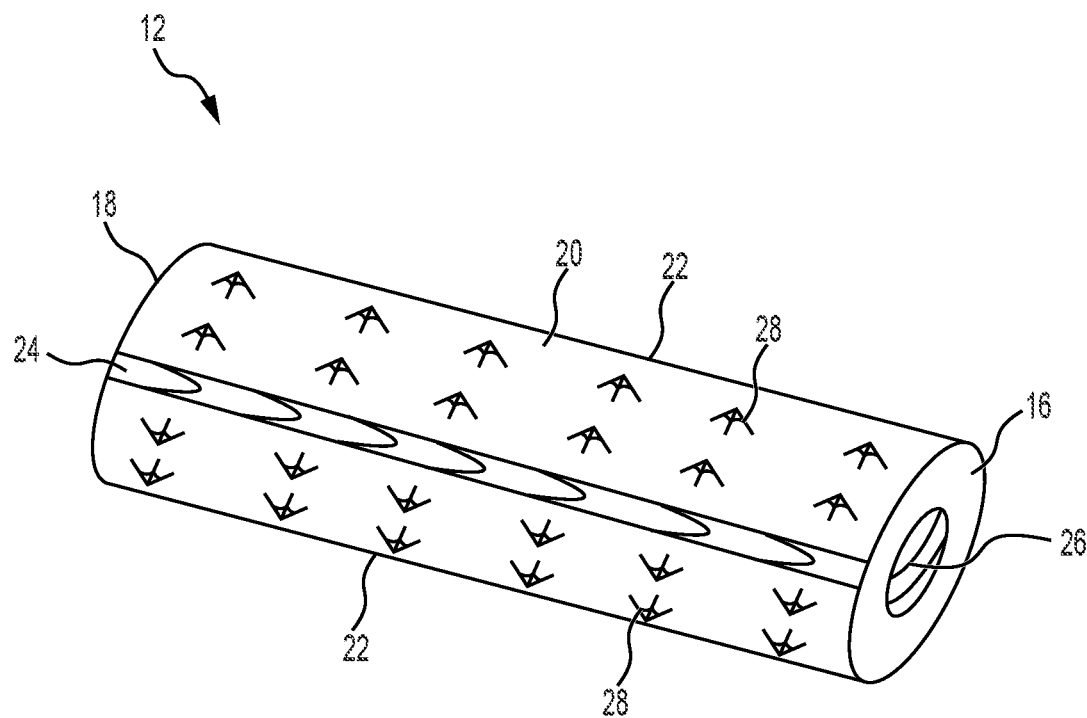
FIG. 2 shows a perspective view of the expandable bone anchor of FIG. 1 according to one embodiment.
Figure 3:
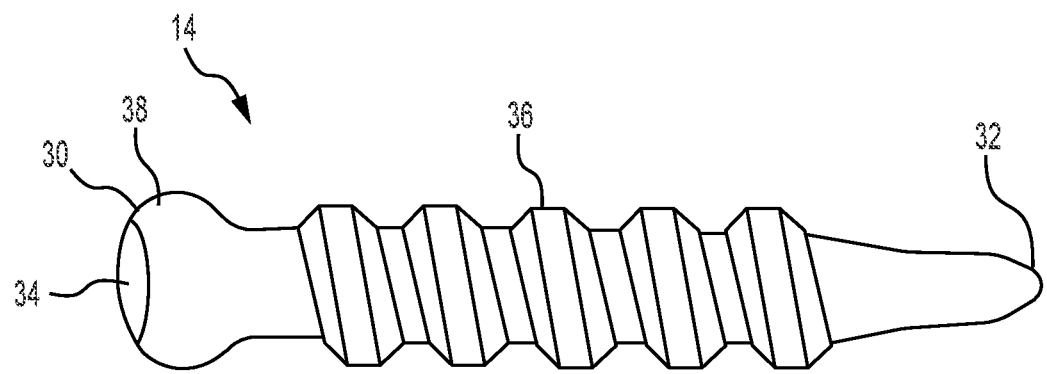
FIG. 3 shows a side view of the pedicle screw of FIG. 1 according to one embodiment.
Figure 4:
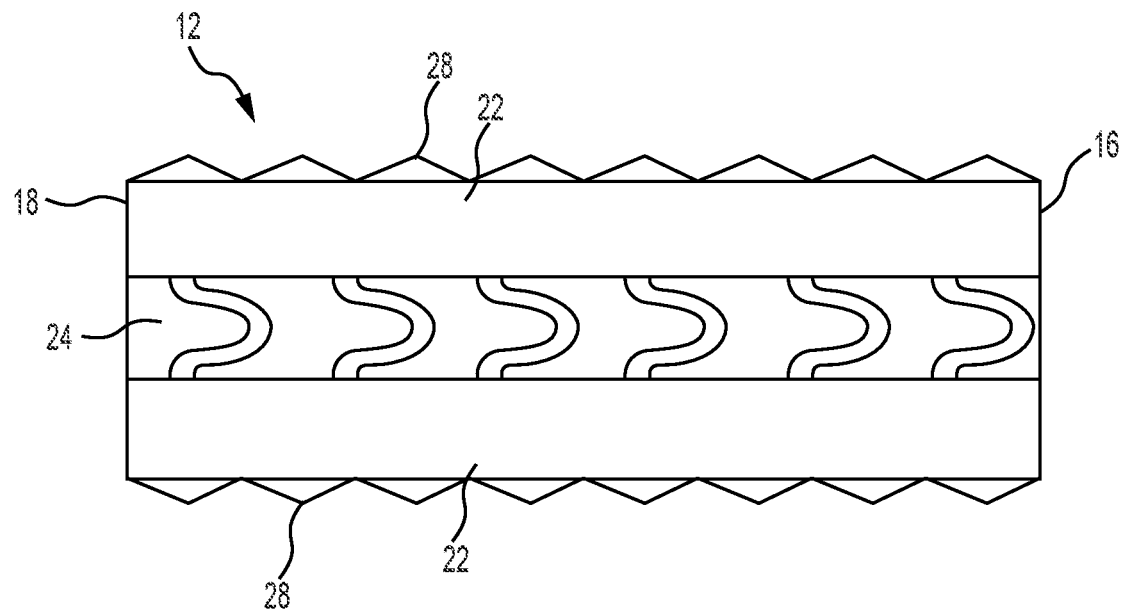
FIG. 4 is a side view of the expandable bone anchor in an expanded state according to one embodiment.

Turning now to FIGS. 2-5, the pedicle fixation implant 10 is shown in more detail. The pedicle implant 10 may include an expandable bone anchor 12 and a pedicle screw 14. As best seen in FIG. 2, the expandable bone anchor 12 has a collapsed configuration, thereby allowing the anchor 12 to be inserted through the pedicle 6 and into the vertebral body 4 of the vertebra 2, for example, in a minimally invasive manner. Once inserted in the vertebral body 4, the bone anchor 12 may be expanded into an expanded configuration, as best seen in FIG. 4, thereby creating a strong press-fit in the bone. Alternatively, the anchor 12 may be placed in the pedicle 6 or cancellous bone only. After the bone anchor 12 is installed, the pedicle screw 14 may be inserted through the pedicle 6 and driven into the expanded bone anchor 12 to complete the final assembly 10. The anchor 12 may be expanded to size, for example, with an instrument and then the pedicle screw may be inserted afterwards. Alternatively, the pedicle screw 14 may expand the anchor 12 during insertion of the pedicle screw 14 into the anchor 12.

The bone implants or components thereof may be comprised of titanium, stainless steel, cobalt chrome, cobalt-chrome-molybdenum, tungsten carbide, carbon composite, plastic or polymer—such as polyetheretherketone (PEEK), polyethylene, ultra-high molecular weight polyethylene (UHMWPE), resorbable polylactic acid (PLA), polyglycolic acid (PGA), combinations or alloys of such materials or any other appropriate material that has sufficient strength to be secured to and hold bone, while also having sufficient biocompatibility to be implanted into a body. Although the above list of materials includes many typical materials out of which implants may be made, it should be understood that implants comprised of any appropriate material are contemplated.

With further emphasis on FIG. 2, the expandable anchor 12 may have a body extending from a first end 16 to a second end 18 along a central longitudinal axis. The first end 16 may be a proximal end and the second end 18 may be a distal end configured to be inserted through the pedicle 6 and into the vertebral body 4 of the vertebra 2. The anchor 12 may have a generally cylindrical outer shape in its collapsed and/or expanded configuration. However, various profile geometries could be utilized in order to increase the press fit force generated during expansion of the anchor 12.

Figure 5:
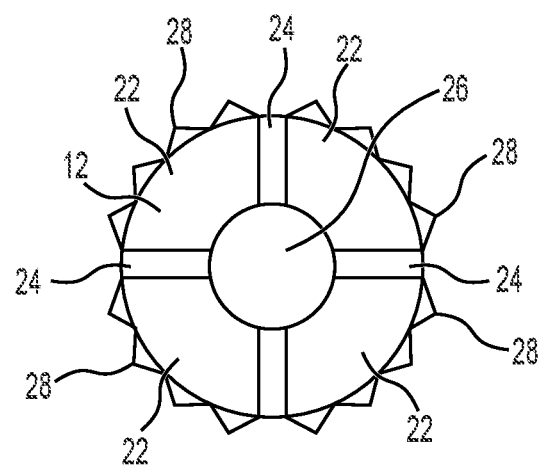
FIG. 5 shows a cross-sectional view of the expandable bone anchor in a collapsed state according to one embodiment.

The anchor 12 may include a multi-component body 20. For example, the body 20 may include a plurality of expandable sections 22 configured to radially expand outward and away from one another. The expandable sections 22 may be separated from one another by one or more expansion joints 24. The expanding joints 24 allow the anchor 12 to expand and fill the prepared hole 8 through the pedicle 6 and/or vertebral body 4. In one embodiment, as best seen in FIG. 5, the anchor 12 may be divided into four expandable sections 22 or quadrants each adjacent to an expansion joint 24. Although four expandable joints 24 are exemplified, the anchor 12 could have various numbers of sections/joints in order to facilitate expansion and fit the desired hole size and shape in the vertebral body 4 and/or pedicle 6.

The anchor sections 22 may be attached together by malleable or flexible material in the expansion joint 24 that allows the expandable sections 22 to expand while still maintaining connection to each other. The malleable or flexible material may be fabricated from a polymeric material or other naturally resilient material, such as a shape memory alloy, or other resilient biocompatible material of sufficient strength and durability for expanding and securing the expandable sections 22. Alternatively, the expansion joints 24 may include a mechanical joint, such as a hinge, spring, or the like. When the expandable sections 22 are expanded apart, a width of the expansion joint 24 increases, thereby increasing the overall diameter of the anchor 12.

The anchor 12 may be cannulated and include a through hole 26 arranged along the central longitudinal axis of the anchor 12. The expandable sections 22 may form a plurality of segments or arcs surrounding the through hole 26. The through hole 26 may extend from the proximal end 16 to the distal 18 or along a portion thereof. The through hole 26 may have a constant diameter or may vary along the length of the anchor 12. The through hole 26 may be internally threaded and configured to engage with corresponding threads 36 along the pedicle screw 14. The diameter of the through hole 26 may increase as the anchor 12 is expanded outwards.

The anchor 12 may include a plurality of serrations, friction enhancing surfaces, ridges, or teeth 28, for example. The serrations or teeth 28 may be configured to grip the bone of the vertebrae 2. The serrations or teeth 28 may extend along the entire length of the anchor 12 or a portion thereof. The outside of the anchor 12 may include a pattern of teeth 28 in order to increase the bone to implant surface area contact. In this embodiment, the teeth 28 are shown as being pyramidal but the variations in teeth geometry are limitless. It would be ideal to select a tooth geometry that optimizes the interaction with the patient's bone taking into account the bone mineral density in the area where the anchor 12 is expanded. When the anchor 12 is expanded, the teeth 28 are configured to press into the surrounding bone to further stabilize the anchor 12.

With further emphasis on FIG. 3, the pedicle screw 14 may have a body extending from a first end 30 to a second 32 along a central longitudinal axis. The first end 30 of the pedicle screw 14 may be a proximal end and may include a recess 34 configured to receive an instrument for inserting the pedicle screw 14. The first end 30 may have an enlarged head portion 38 or may be otherwise configured (e.g., headless). As best seen in FIG. 1, when installed, the head 38 of the pedicle screw 14 may protrude outside the vertebra 2 to receive a tulip or other assembly for attaching a rod or similar construct. The second end 32 may be a distal end configured to be inserted into the pedicle 6 of vertebra 2 and into the through hole 26 in the proximal end 16 of the anchor 12. In this manner, the central longitudinal axis of the pedicle screw 14 may be generally aligned with the central longitudinal axis of the expandable anchor 12. The second end 32 of the pedicle screw 14 may have a distal tip that is blunt, pointed, or otherwise configured to engage bone and/or the anchor 12.

As shown in FIG. 1, the length of expandable anchor 12 may be shorter than the length of the pedicle screw 14 such that the expandable anchor 12 is only provided at a distal region of the screw 14 (e.g., within the vertebral body 4). Alternatively, the pedicle screw 14 may be threaded through the expandable anchor 12 such that expandable anchor 12 may be provided at a proximal region of the screw 14 (e.g., within the pedicle 6). Alternatively, the expandable anchor 12 may have a length similar to the length of the shaft of the screw 14, thereby allowing for fixation in the vertebral body 4 and the pedicle 6 of the vertebra 2.

The body of the pedicle screw 14 may include one or more threads 36 along the entire length of the shaft or a portion thereof. The thread 36 may have a suitable angle, lead, pitch, etc. to enhance insertion and/or engagement with the bone and/or engaged to the anchor 12. The outer diameter of the pedicle screw 14 may be constant or may vary along its length. For example, the distal end 32 may have a reduced diameter. Although a pedicle screw 14 is exemplified in this embodiment, it will be appreciated that the pedicle screw 14 could be substituted with another fastener, such as a nail or other fixation device.

Figure 6:
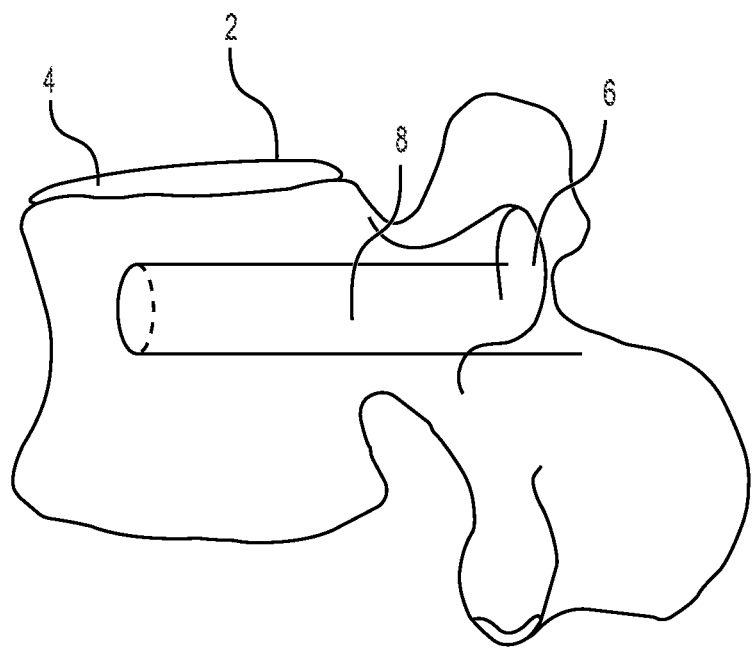
FIG. 6 is a sagittal view of a vertebra depicting a bone channel or tunnel cut through the pedicle and into the vertebral body.
Figure 7:
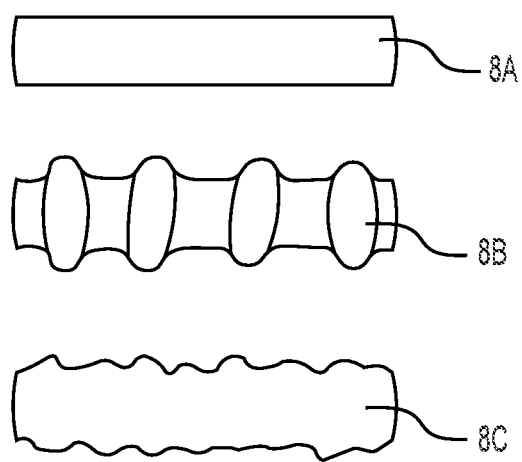
FIG. 7 shows alternative types of bone channels or tunnels.
Figure 8:
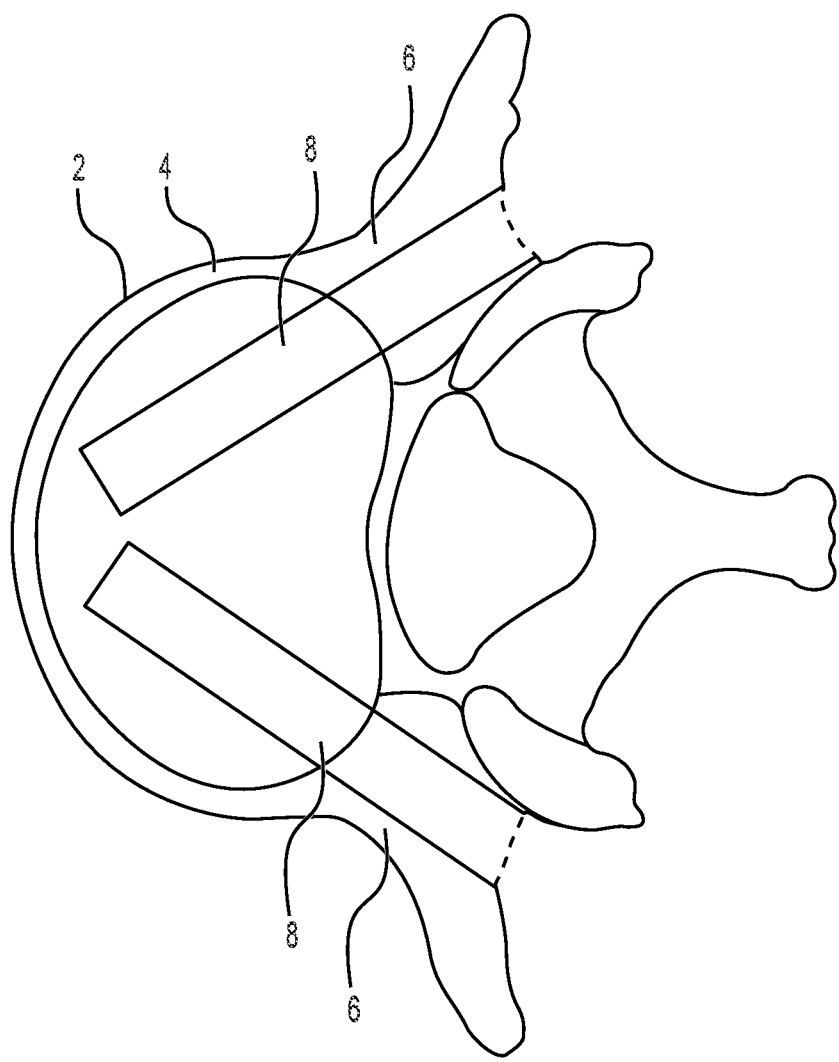
FIG. 8 shows an axial view of the vertebra with bilateral bone channels through both of the pedicles.

Turning now to FIGS. 6-8, one or more tunnels or channels 8 may be created through the pedicle 6 and into the vertebral body 4. The channel 8 may be created with a bone drill or other suitable instrument. As shown in FIG. 7, the channels 8 may have a smooth surface 8A (e.g., with a constant diameter), a ridged surface 8B (e.g., with evenly spaced ridges), or a randomized surface 8C. As shown in FIG. 8, a pair of bilateral channels 8 may be cut through each pedicle 6 of the vertebra 2 and into the vertebral body 4. The bilateral channels 8 may point medially toward one another or along another suitable trajectory selected by the surgeon.

According to one embodiment, the system 10 may be implanted as follows: (1) The hole or channel 8 for the bone anchor 12 is prepared by drilling through the pedicle 6 and into the vertebrae 2, for example, along the same trajectory that a normal pedicle screw would be placed. (2) The bone anchor 12 is fully seated at the end of the previously prepared hole 8. (3) The bone anchor 12 is expanded, thereby creating a strong press fit in the bone. (4) The pedicle screw 14 is inserted into the prepared hole 8 and driven into the expanded bone anchor 12, thereby securing and anchoring the pedicle screw 14 to the expanded anchor 12.

The expansion of the anchor 12 may be accomplished through one or more methods. A specialized instrument (not shown) may be inserted into the prepared hole 8 and through the anchor 12 where the anchor 12 is then expanded under force generated from the instrument. This expansion force could be due to threading the instrument through an undersized or tapered thread inside the anchor 12 which causes the expandable sections 22 to expand radially outward. As an alternative, the instrument tip may expand mechanically or inflate like a balloon similar to balloon deployed stents. In an alternative method, insertion of the pedicle screw 14 into the anchor 12 simultaneously expands the anchor 12 as the pedicle screw 14 is threaded through the anchor 12.

Figure 9:
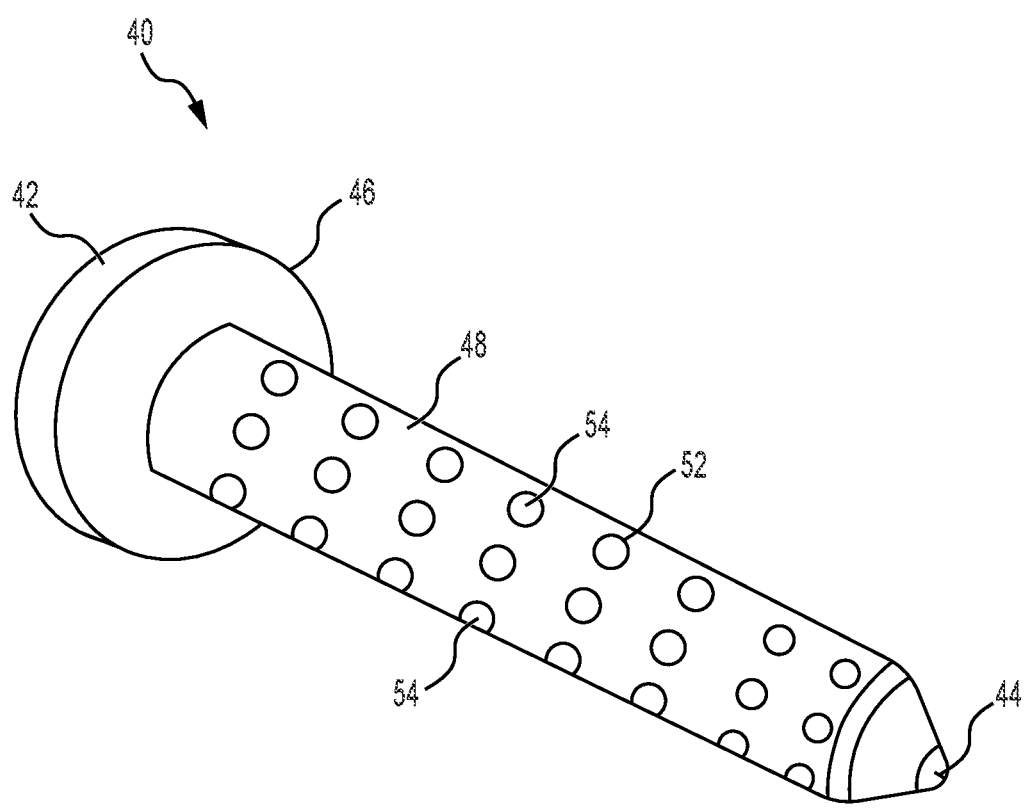
FIG. 9 shows an expandable plug with deployable teeth configured to fill the prepared bone channel according to one embodiment.
Figure 10:
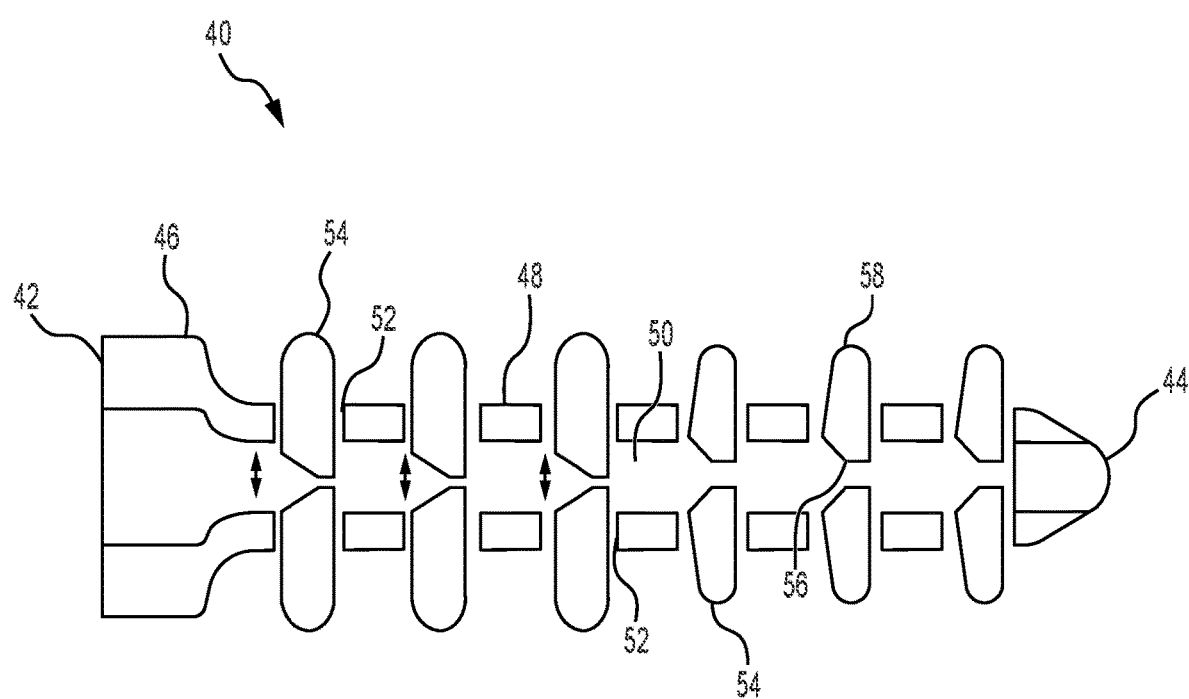
FIG. 10 shows the moveable anchor teeth ejected from the expandable plug of FIG. 9 according to one embodiment.

Turning now to FIGS. 9 and 10, an orthopedic fixation assembly, expandable plug, or implant 40 according to another embodiment is shown. In this embodiment, individual anchors or teeth 54 are deployable from the anchor body 48 in order to secure the implant 40 in the bone. The implant 40 may have a body extending from a first end 42 to a second end 44 along a central longitudinal axis. The first end 42 of the implant 40 may be a proximal end and the second end 44 may be a distal end configured to be inserted through the pedicle 6 and into the vertebral body 4 of the vertebra 2 to fill the prepared bone tunnel 8. The proximal end 42 may define an enlarged head, flange, or flat head 46 and the distal end 44 may define a pointed, sharpened, or a blunt end configured to engage bone.

The implant 40 includes a shank 48 extending along the central longitudinal axis from the flat head 46 to the distal end 44. The shank 48 may have a generally cylindrical shape, however, various profile geometries could be utilized in order to increase the fit of the implant 40 in the bone channel 8. The implant 40 is cannulated with a center channel 50 extending along its length. The center channel 50 is in fluid communication with a plurality of perforations or openings 52 configured to guide the deployable teeth 54.

The deployable teeth 54 may include prongs, spikes, or other anchors configured to secure the implant 40 in bone. Each anchor or tooth 54 may be elongated with an inner end 56 receivable in the central channel 50 and an outer end 58 configured to eject from the openings 52. The inner end 56 of each tooth 54 may have an angled or sloped portion configured to help expand the teeth 54, for example, mechanically, pneumatically, or hydraulically. The outer end 58 may be pointed, sharpened, blunt, or otherwise configured to engage bone when ejected or expanded. The teeth 54 may be positioned generally transverse to the central longitudinal axis of the shank 48. In particular, the teeth 54 may be aligned generally perpendicular to the central longitudinal axis of the shank 48. The teeth 54 may be arranged in a pattern or array around the periphery of the shank 48 or alternatively in a random configuration. The array of teeth 54 may extend along the entire length of the shank 48 or along a portion thereof.

The teeth 54 may be ejected pneumatically or with pressurized liquid, bone cement, or the like. Alternatively, the teeth 54 may be ejected mechanically with a piston, drive member, or threaded internal shaft configured to interface with the teeth 54, for example. As shown in FIG. 9, in the retracted position, the teeth 54 are retracted inside the body of the shank 48. In the deployed position shown in FIG. 10, the teeth 54 are extended radially outward and away from one another. In this embodiment, the anchor diameter is fixed while the teeth 54 on the anchor surface are deployed from the anchor body 48 in order to secure the implant 40 in the bone.

Figure 11:
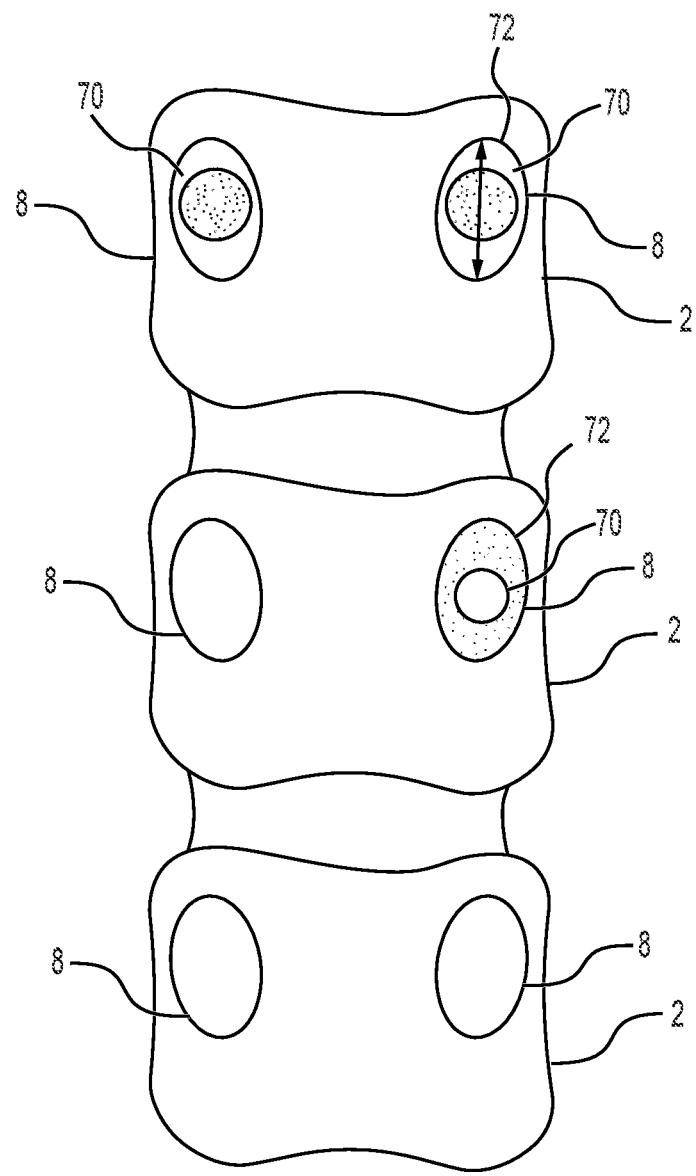
FIG. 11 is a posterior view of a portion of the spine including the bone channels through the pedicles and unused pedicle space around each pedicle screw.
Figure 12:
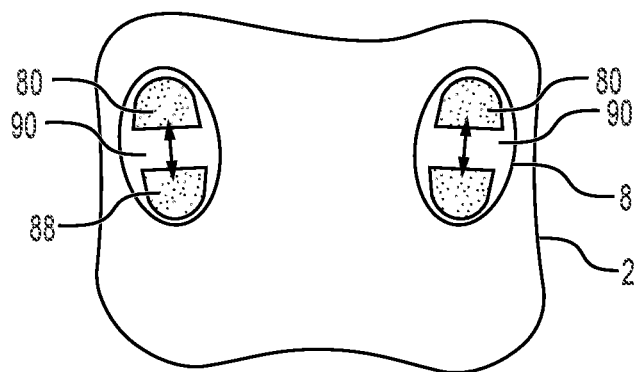
FIG. 12 is a posterior view of a vertebra with an implant expanded to fill the unused pedicle space according to one embodiment.
Figure 13:
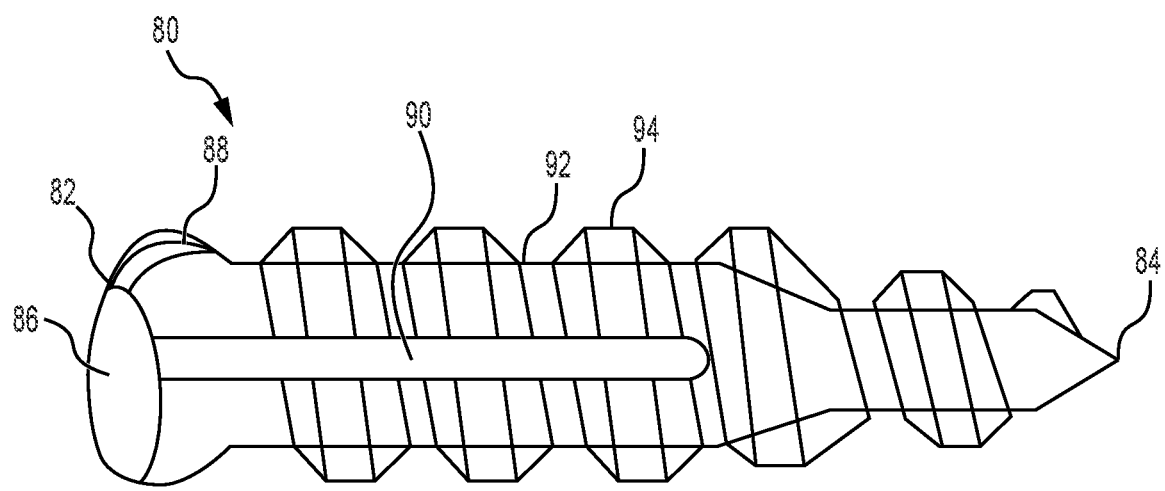
FIG. 13 is an expandable implant with an expandable head and proximal portion according to one embodiment.

Turning now to FIGS. 11-13, an expandable implant 80 is shown according to another embodiment. In this embodiment, the proximal portion of the implant 80 is configured to expand to fill unused space 72 in the pedicle 6. As shown in FIG. 11, a posterior view of the spine is shown with bilateral channels 8 cut through the pedicles 6. Cylindrical pedicle screws 70 are inserted into the channel 8 but unused space 72 exists around the screws 70. It is believed up to 60% of screw pullout strength may be derived from the spine pedicle 8 itself. Anatomical investigations of lumbar pedicles 6 have shown that the pedicles 6 are ovular in shape which means much of the surrounding bone tissue, especially cortical bone, is not utilized by traditional pedicle screws 70. FIG. 11 represents the gaps 72 and unused bone within the pedicle 6 that is not accessed by cylindrical pedicle screws 70. There is potential to increase the stability of implanted pedicle screws 70 within the pedicle 6 if this bone could be used safely. An increase in stability may reduce the likelihood of screw loosening and construct failure.

In the embodiment shown in FIGS. 12 and 13, the pedicle screw 80 is configured to expand in a specific section of the screw 80 within the pedicle 6. This allows the screw to gain purchase on unused areas of cortical bone which provides maximum strength and stability. The expandable implant 80 may have a body extending from a first end 82 to a second 84 along a central longitudinal axis. The first end 82 of the implant 80 may be a proximal end and may include a recess 86 configured to receive an instrument for inserting the pedicle screw 80. The first end 82 may have an enlarged head portion 88 or may be otherwise configured (e.g., headless). The head 86 may be configured to receive a tulip or other assembly for attaching a rod or similar construct. The head 88 and a proximal portion of the implant 80 may be bifurcated by a slot or slit 90. The slit 90 may extend along a longitudinal plane. The slit 90 may extend through a proximal section of the shank 92 (e.g., about half-way through the shank 92). Although a single slit 90 is exemplified, it will be appreciated that additional slits may be provided to enlarge the head 88 and proximal shank 92. The second end 84 of the implant 80 may be a distal end configured to be inserted into the pedicle 6 of vertebra 2. The second end 84 may have a distal tip that is sharpened, pointed, blunt, or otherwise configured to engage bone.

The shank 92 of the pedicle screw 80 may include one or more threads 94 along the entire length of the shank 92 or a portion thereof. The thread 94 may have a suitable angle, lead, pitch, etc. to enhance insertion and/or engagement with the bone. The outer diameter of the pedicle screw 80 may be constant or may vary along its length. For example, the distal end 84 may have a reduced diameter. Although an expandable pedicle screw 84 is exemplified in this embodiment, it will be appreciated that the implant does not necessarily need to be a screw or threaded but can have geometries of various shapes to facilitate the expansion within the spine pedicle 6.

As best seen in FIG. 12, the proximal end 82 of the implant 80 may be expanded to increase purchase in the pedicle 6. In particular, a drive, shaft, wedge, or other implement (not shown) may be introduced into the slit 90 to thereby drive the opposite portions of the head 88 and shaft 92 apart and away from one another. In this manner, the enlarged or expanded anchor 80 is configured to utilize the previously unused pedicle space 72 engaging the cortical bone and thereby increasing the screw pullout strength. It will be appreciated that the pedicle screw implant 80 may be used instead of pedicle screw 14 described previously with the expandable anchor 12, such that the resulting implant secures both ends in the vertebral body 4 and pedicle 6, respectively.

Inadequate construct stability due to pedicle screw loosening is a major clinical concern. Failure to stabilize the spine may impede the fusion process of the spine segment targeted for fusion. This can lead to a revision surgery which comes with its own array of risk and problems for both the surgeon and patient. The anchor-pedicle screw constructs aim to improve the initial stability of the implant all while dampening the effects of micro motion due to the patient cyclically loading the rod and pedicle screw constructs. This may allow for better osseointegration of the bone around and on the implanted devices which may improve construct stability and facilitate fusion of the spine segment.

It will be further understood that various changes in the details, materials, and arrangements of the parts which have been described and illustrated in order to explain the nature of this invention may be made by those skilled in the art without departing from the scope of the invention as expressed in the claims. One skilled in the art will appreciate that the embodiments discussed above are non-limiting. It will also be appreciated that one or more features of one embodiment may be partially or fully incorporated into one or more other embodiments described herein.

What is claimed is:

1. An expandable implant for positioning in a spine comprising:
   an expandable anchor having a body with a plurality of expandable sections separated by one or more expansion joints, the anchor includes a central through hole arranged along a central longitudinal axis of the anchor; and
   a pedicle screw having a head and a shaft, wherein the pedicle screw is receivable in the expandable anchor, and wherein the expandable anchor has a collapsed configuration and an expanded configuration, wherein in the expanded configuration, the expandable anchor is configured to press fit in adjacent bone,
   wherein each of the one or more expansion joints comprise a length greater than a width, the length extending parallel to the central longitudinal axis of the anchor, and each of the one or more expansion joints comprise a resilient material configured to allow expansion of the expandable anchor while maintaining connection of the plurality of expandable sections to each other, the expandable anchor is configured to be positioned in a pedicle of the spine, the head of the pedicle screw includes a tulip for receiving and securing a rod, and the tulip of the pedicle screw is configured to protrude out of the vertebra.

2. The implant of claim 1, wherein the plurality of expandable sections are configured to radially expand outward and away from one another, thereby increasing an outer diameter of the anchor.

3. The implant of claim 1, wherein when the expandable sections are expanded apart, a width of each expansion joint increases to enlarge the anchor.

4. The implant of claim 1, wherein the expandable anchor has a cylindrical shape.

5. The implant of claim 1, wherein the expandable anchor includes four expandable sections each adjacent to one expansion joint.

6. The implant of claim 1, wherein the expansion joints comprise a malleable or flexible material.

7. The implant of claim 1, wherein the central through hole is internally threaded and configured to engage with corresponding threads along the shaft of the pedicle screw.

8. The implant of claim 1, wherein the anchor includes a plurality of teeth arranged in an array about the periphery of the expandable sections.

9. The implant of claim 8, wherein the plurality of teeth are pyramidal in shape.

10. The implant of claim 1, wherein a length of the expandable anchor is shorter than a length of the pedicle screw.

\* \* \* \* \*